(12) United States Patent
Zheng

(10) Patent No.: US 10,782,926 B2
(45) Date of Patent: Sep. 22, 2020

(54) DOUBLE-SCREEN DISPLAY DEVICE AND SWITCH METHOD FOR CONTROLLING THE SAME

(71) Applicant: Wuhan China Star Optoelectronics Semiconductor Display Technology Co., Ltd., Wuhan (CN)

(72) Inventor: Min Zheng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/323,536

(22) PCT Filed: Jan. 28, 2019

(86) PCT No.: PCT/CN2019/073349
§ 371 (c)(1),
(2) Date: Feb. 6, 2019

(87) PCT Pub. No.: WO2020/124744
PCT Pub. Date: Jun. 25, 2020

(65) Prior Publication Data
US 2020/0272398 A1    Aug. 27, 2020

(30) Foreign Application Priority Data
Dec. 17, 2018    (CN) .......................... 2018 1 1544213

(51) Int. Cl.
*G06F 3/14*    (2006.01)
*G06K 9/00*    (2006.01)
(Continued)

(52) U.S. Cl.
CPC .......... *G06F 3/1423* (2013.01); *G06F 1/1626* (2013.01); *G06F 1/1649* (2013.01);
(Continued)

(58) Field of Classification Search
CPC .... G06F 3/1423; G06F 3/1626; G06F 1/1649; H04N 5/2257; H04N 5/23219; G06K 9/00013; H04M 1/725
See application file for complete search history.

(56) References Cited

U.S. PATENT DOCUMENTS

| 10,579,175 | B2* | 3/2020 | Seol ...................... G06F 3/0412 |
| 2011/0216209 | A1* | 9/2011 | Fredlund ................. G06F 21/32 |
| | | | 348/211.99 |

(Continued)

FOREIGN PATENT DOCUMENTS

| CN | 106775207 | 5/2017 |
| CN | 107835359 | 3/2018 |

(Continued)

*Primary Examiner* — Darlene M Ritchie

(57) ABSTRACT

The present invention provides a double-screen display device, including a front screen having at least a first display area for displaying information required by a user; and a rear screen having at least a second display area, a fingerprint sensor, a sensor group, a camera module and a microphone. The fingerprint sensor is located on a bottom of the second display area. The sensor group, the camera module and the microphone are located on a top of the second display area. The front screen and the rear screen are controlled and switched according to a switching condition by a central processor unit in the double-screen display device.

1 Claim, 4 Drawing Sheets

(51) Int. Cl.
*H04N 5/225* (2006.01)
*G06F 1/16* (2006.01)
*H04N 5/232* (2006.01)
*H04M 1/725* (2006.01)

(52) U.S. Cl.
CPC ....... *G06K 9/00013* (2013.01); *H04N 5/2257* (2013.01); *H04N 5/23219* (2013.01); *H04M 1/725* (2013.01)

(56) References Cited

U.S. PATENT DOCUMENTS

| | | | | |
|---|---|---|---|---|
| 2013/0300689 | A1* | 11/2013 | Park | G06F 3/041 |
| | | | | 345/173 |
| 2015/0130738 | A1* | 5/2015 | Park | G06F 3/1446 |
| | | | | 345/173 |
| 2017/0351336 | A1* | 12/2017 | Yang | G06F 3/041 |
| 2018/0007192 | A1* | 1/2018 | Tanabe | H04M 1/72569 |
| 2018/0124223 | A1* | 5/2018 | Xie | H04W 52/0254 |
| 2018/0189468 | A1* | 7/2018 | Shim | G06F 3/0488 |
| 2019/0080066 | A1* | 3/2019 | Van Os | H04N 5/23222 |
| 2019/0379857 | A1* | 12/2019 | Yuan | H04N 5/23219 |

FOREIGN PATENT DOCUMENTS

| | | | | |
|---|---|---|---|---|
| CN | 107835359 | A * | 3/2018 | ............ H04N 5/232 |
| CN | 108537021 | | 9/2018 | |
| CN | 108769409 | | 11/2018 | |
| CN | 108769409 | A * | 11/2018 | ............ H04N 5/232 |

\* cited by examiner

DOUBLE-SCREEN DISPLAY DEVICE AND SWITCH METHOD FOR CONTROLLING THE SAME

RELATED APPLICATIONS

This application is a National Phase of PCT Patent Application No. PCT/CN2019/073349 having International filing date of Jan. 28, 2019, which claims the benefit of priority of Chinese Patent Application No. 201811544213.5 filed on Dec. 17, 2018. The contents of the above applications are all incorporated by reference as if fully set forth herein in their entirety.

FIELD AND BACKGROUND OF THE INVENTION

The present invention relates to a display technical field, and more particularly to a double-screen display device and a switch method for controlling the same.

In recent years, with the competition of mobile phone industry, a functional mobile phone is more and more abundant. The mobile phone needs to display more information or pictures to the people, in order to be convenient for people to see themselves behind the camera, and to adjust their satisfactory style according to an image displayed in a rear screen. Therefore, it needs a function of switching a front screen and a rear screen for meeting the needs of users.

In summary, a double-screen display device of the prior art can not intelligently switch double screens for display according to the application environment, and will result in a poor user experience. Therefore, it is necessary to provide a new type double-screen display device and a switch method for controlling the double-screen display device to improve this defect.

The embodiment of the present invention provides a double-screen display device to solve the technical problem that the prior double-screen display device can not intelligently switch double screens for display according to the application environment.

SUMMARY OF THE INVENTION

Technical Solutions

To solve the above problems, the technical scheme provided by the embodiment of the present invention is as follows:

The embodiment of the present invention provides a double-screen display device, comprising:

a front screen, including at least a first display area for displaying information required by a user; and a rear screen, including at least a second display area, a fingerprint sensor, a sensor group, a camera module and a microphone; the fingerprint sensor being located on a bottom of the second display area; the sensor group, the camera module and the microphone being located on a top of the second display area;

wherein the front screen and the rear screen are controlled and switched according to a switching condition by a central processor unit in the double-screen display device; the switching condition including any one of a first restrictive condition and a second restrictive condition;

the first restrictive condition being selected from an information group, which includes a flip angle of the double-screen display device, a distance between a face and the double-screen display device, and contact areas between a user's hand and the screens; and the second restrictive condition including at least a light intensity.

In the double-screen display device provided by the embodiment of the present invention, wherein the fingerprint sensor has a function of triggering a camera.

In the double-screen display device provided by the embodiment of the present invention, the sensor group includes at least one of an acceleration sensor and an optical sensor.

In the double-screen display device provided by the embodiment of the present invention, the camera module includes a distance sensor.

The embodiment of the present invention provides a switch method for controlling a double-screen display device as claimed in claim 1, comprising the steps of:

S10) awaking the rear screen, and flipping the double-screen display device;

S20) sensing a flip of the double-screen display device, and transmitting a sensing signal to the central processor unit of the double-screen display device by the acceleration sensor and the optical sensor; and S30) processing the sensing signal and controlling and awaking the front screen by the central processor unit.

In the double-screen display device provided by the embodiment of the present invention, in the step S10), the double-screen display device is flipped from forward to backward, or from backward to forward, or less than 90 degrees.

In the double-screen display device provided by the embodiment of the present invention, the front screen and the rear screen are equivalent.

The embodiment of the present invention provides a switch method for controlling a double-screen display device as claimed in claim 1, comprising the steps of:

S10) awaking the rear screen and holding the double-screen display device in hand;

S20) transmitting a distance signal by the distance sensor to the central processor unit of the double-screen display device when the distance sensor senses a face 100 cm away; and S30) processing the distance signal and controlling the double-screen display device to be in a normal photographic mode by the central processor unit.

In the double-screen display device provided by the embodiment of the present invention, in the step S20), the double-screen display device can be controlled in a self-timer mode by the central processor unit when the distance sensor senses the face within 100 cm.

Beneficial Effect

The beneficial effects of the present invention are as follows. The present invention provides a double-screen display device and a switch method for controlling the same for meeting the diversified functional requirements of consumers for the double-screen display device, being capable of displaying more information, achieving product differentiation, increasing functionality, and bringing a better experience of taking photos.

BRIEF DESCRIPTION OF THE SEVERAL VIEWS OF THE DRAWINGS

For more clearly illustrating the technical scheme in the embodiment of the present invention or the prior art, the following text will briefly introduce the accompanying drawings used in the embodiment and the prior art. It is obvious that the accompanying drawings in the following description are only some embodiments of the present invention. For the technical personnel of the field, other drawings can also be obtained from these drawings without paying creative work.

DESCRIPTION OF SPECIFIC EMBODIMENTS OF THE INVENTION

The following description of every embodiment with reference to the accompanying drawings is used to exemplify a specific embodiment, which may be carried out in the present invention. Directional terms mentioned in the present invention, such as "upper", "lower", "front", "back", "left", "right", "inside", "outside", "side" etc., are only used with reference to the orientation of the accompanying drawings. Therefore, the used directional terms are intended to illustrate, but not to limit the present invention. In the figure, units with similar structures are represented by the same label.

A double-screen display device of the prior art can not intelligently switch double screens for display according to the application environment, and can result in a poor user experience. The embodiment of the present invention can solve the defect.

Figure 1:
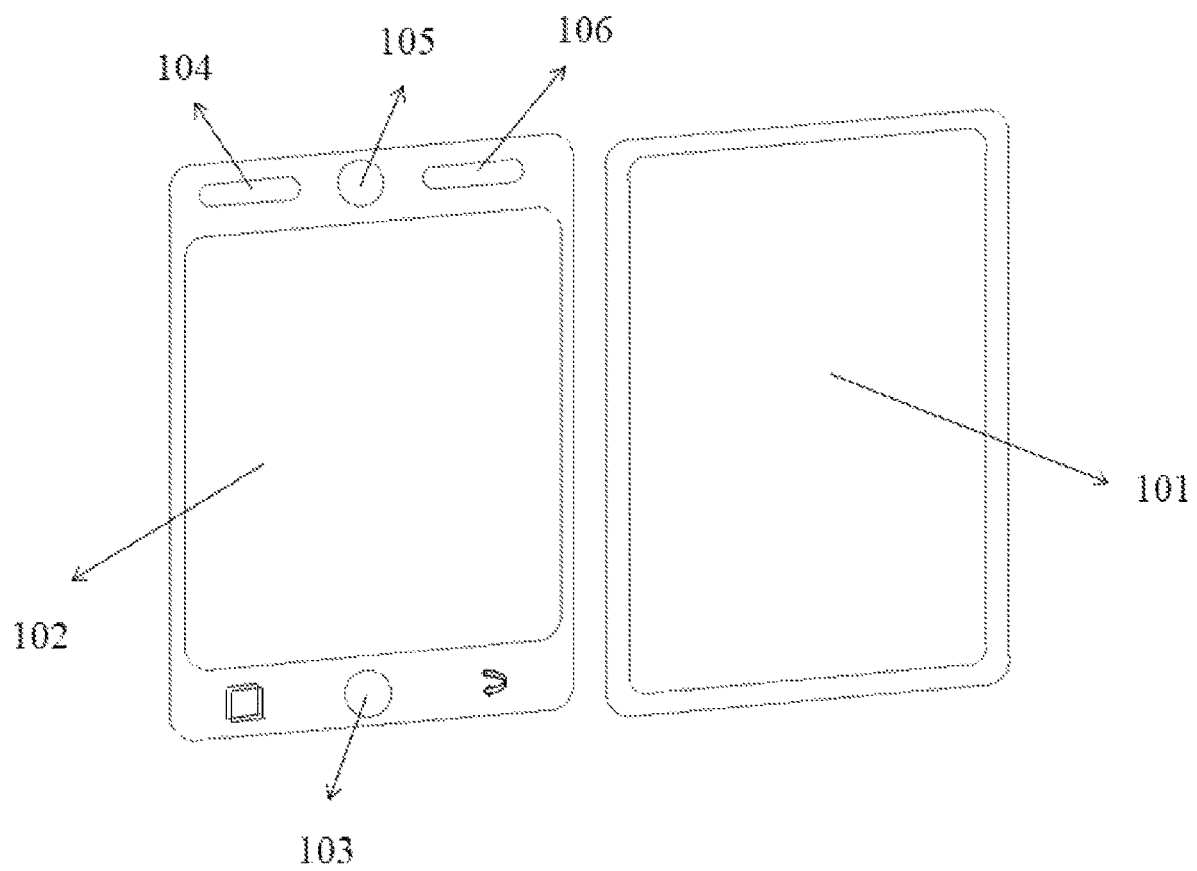
FIG. 1 is a structure view of a double-screen display device provided in the embodiment of the present invention.

Referring to FIG. 1, it shows a double-screen display device provided in the embodiment of the present invention, and various components of the present invention and the relative position relationship of the various components can be intuitively seen in the figure. The double-screen display device includes at least a front screen and a rear screen. The front screen includes at least a first display area 101 for being used to display information required by a user; and the rear screen includes at least a second display area 102, a fingerprint sensor 103 located on a bottom of the second display area 102, a sensor group 104, a camera module 105 and a microphone 106. The sensor group 104, the camera module 105 and the microphone 106 are located on a top of the second display area 102. Wherein the front screen and the rear screen can be controlled and switched according to a switching condition by a central processor unit in the double-screen display device. The switching condition includes any one of a first restrictive condition and a second restrictive condition. The first restrictive condition may be selected from an information group, which includes a flip angle of the double-screen display device itself, a distance between a face and the double-screen display device, and contact areas between a user's hand and the screens. The second restrictive condition includes at least a light intensity. Preferably, a length-width ratio of the front screen is 19:9, but a length-width ratio of the rear screen is 16:9 or 19:9.

In the embodiment, the fingerprint sensor 103 has the function of triggering a camera. The sensor group 104 includes at least one of an acceleration sensor and an optical sensor. The camera module 105 includes a distance sensor.

Figure 2:
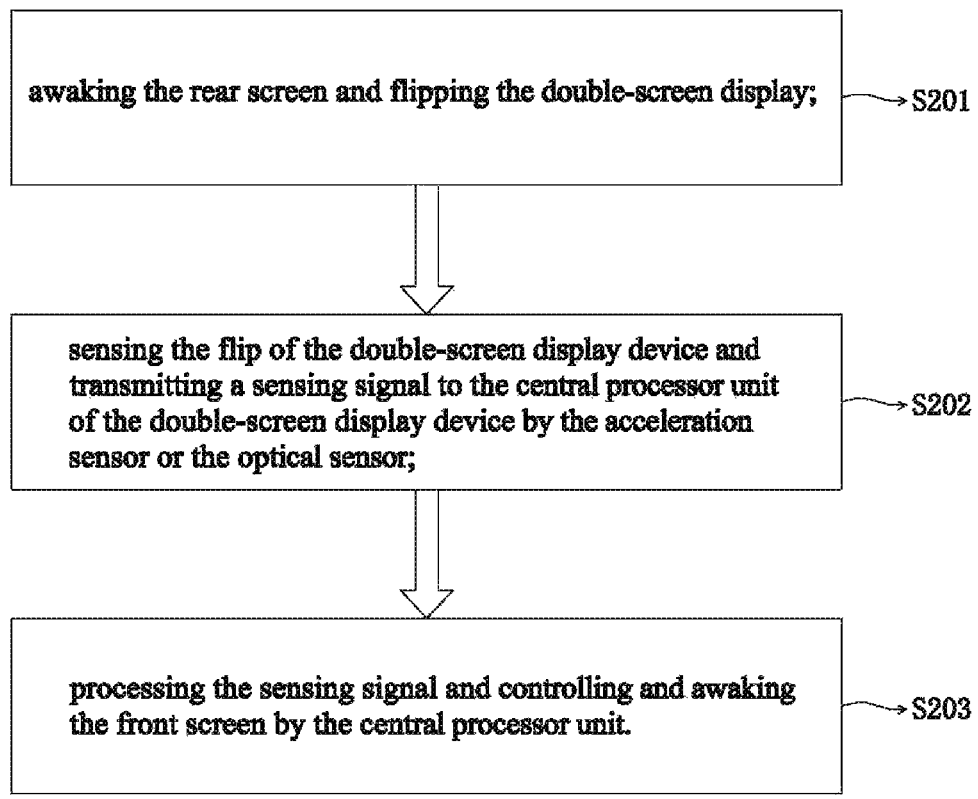
FIG. 2 is a flowchart showing a switch method for controlling the double-screen display device in a first embodiment of the present invention.

Referring to FIG. 2, a first embodiment of the present invention provides a switch method for controlling the double-screen display device. The switch method includes following steps.

A step S201 is awaking the rear screen and flipping the double-screen display device.

A step S202 is sensing the flip of the double-screen display device and transmitting a sensing signal to the central processor unit of the double-screen display device by the acceleration sensor or the optical sensor.

A step S203 is processing the sensing signal and controlling and awaking the front screen by the central processor unit.

Wherein, in the step S201, the double-screen display device is flipped from forward to backward, or from backward to forward, or less than 90 degrees. The front screen and the rear screen are equivalent. That is, the user can flip the double-screen display device when the front screen is awaked, and then the rear screen is awaked.

In the embodiment, one screen facing the user always keeps awake. When the user wants to switch to the other screen for operation, he can flip the double-screen display device 180 degrees or a little (according to user's habits). Whether the double-screen display device is flipped from forward to backward or from backward to forward, it can be sensed by the acceleration sensor. Moreover, the optical sensor can also detect an occlusion area of the user's hand to determine whether to switch the screen or not. The optical sensor can transmit a detect signal to the central processor unit, and the central processor unit can make accurate judgments based on the detect signal to control double-screen display device.

Figure 3:
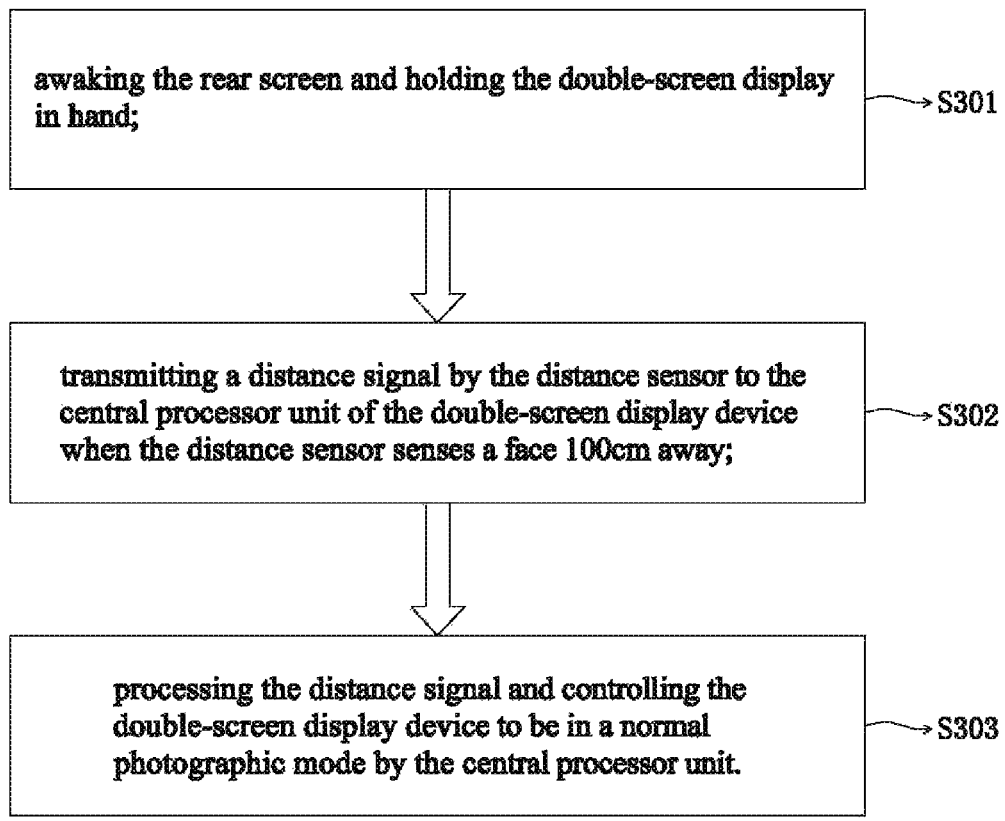
FIG. 3 is a flowchart showing a switch method for controlling the double-screen display device in a second embodiment of the present invention.

Referring to FIG. 3, a second embodiment of the present invention provides a switch method for controlling the double-screen display device. The switch method includes following steps.

A step S301 is awaking the rear screen and holding the double-screen display device in hand.

A step S302 is transmitting a distance signal by the distance sensor to the central processor unit of the double-screen display device when the distance sensor senses a face 100 cm away.

A step S303 is processing the distance signal and controlling the double-screen display device to be in a normal photographic mode by the central processor unit.

Wherein, in the step S302, the double-screen display device is controlled in a self-timer mode by the central processor unit when the distance sensor senses the face within 100 cm.

In the embodiment, when the camera module faces the user, the double-screen display device is in the self-timer mode. Now, the double-screen display device can be flipped to be in the normal photographic mode. When the face is within 100 cm of the double-screen display device or within a range, such as 30 cm to 100 cm of the double-screen display device, the double-screen display device is controlled in the self-timer mode by the central processor unit. When the distance sensor senses the face 100 cm away, the double-screen display device is controlled in the normal photographic mode by the central processor unit. Moreover, when taking a photo of others, the photographed person can see his pose through the rear screen and adjust his pose, thereby getting the photo he want. Therefore, the front screen and the rear screen can be awaked according to user's requirements. Wherein one of the front screen and the rear screen is always bright, and the other of the front screen and the rear screen is off or a part of the modules thereof is bright according to the user's requirements.

Figure 4:
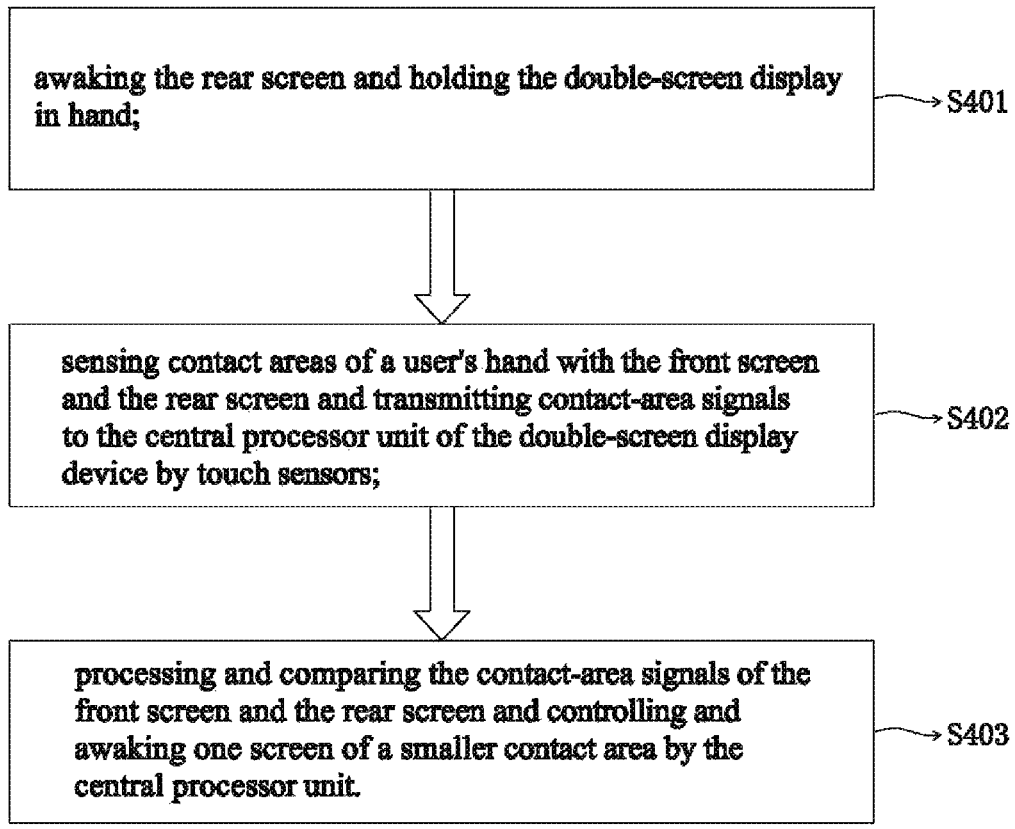
FIG. 4 is a flowchart showing a switch method for controlling the double-screen display device in a third embodiment of the present invention.

Referring to FIG. 4, a third embodiment of the present invention provides a switch method for controlling the double-screen display device. The switch method includes following steps.

A step S401 is awaking the rear screen and holding the double-screen display device in hand.

A step S402 is sensing contact areas of a user's hand with the front screen and the rear screen and transmitting contact-area signals to the central processor unit of the double-screen display device by touch sensors.

A step S403 is processing and comparing the contact-area signals of the front screen and the rear screen and controlling and awaking one screen of a smaller contact area by the central processor unit.

In the embodiment, the double-screen display device is controlled to be switched through the contact sensors sensing the contact areas of the hand with the screens. The contact sensors are distributed throughout the front screen and the rear screen. The contact sensors can sense the contact areas of the hand with the screens, and transmit the contact-area signals to the central processor unit. The central processor unit can compare the contact areas to control and awake the screen of the smaller contact area. Thus, the intelligent switching control is realized.

As described above, the embodiment of the present invention provides the double-screen display device and the switch method for controlling the same for meeting the diversified functional requirements of consumers for the double-screen display device, being capable of displaying more information, achieving product differentiation, increasing functionality, and bringing a better experience of taking photos. The embodiment of the present invention solves the technical problem that the double-screen display device of the prior art cannot intelligently switch the screens for display according to the application environment and can result in a poor user experience.

The double-screen display device and the switch method for controlling the double-screen display device, which are provided by the embodiment of the present invention are described above in detail. It should be understood that the exemplary embodiments described herein should be considered descriptive only to help understand the method and ideas of the invention, and should not be used to limit the invention.

What is claimed is:

1. A switch method for controlling a double-screen display device, the double-screen display device comprising: a front screen, including at least a first display area for displaying information required by a user; and a rear screen, including at least a second display area, a fingerprint sensor, a sensor group, a camera module and a microphone; the fingerprint sensor being located on a bottom of the second display area; the sensor group, the camera module and the microphone being located on a top of the second display area; wherein the front screen and the rear screen are controlled and switched according to a switching condition by a central processor unit in the double-screen display device; the switching condition being selected from any one of the following: a flip angle of the double-screen display device, a distance between a face and the double-screen display device, contact areas between a user's hand and the screens, and a light intensity;

the switch method comprising the steps of:
S10) awaking the rear screen and holding the double-screen display device in hand;
S20) transmitting a distance signal by the distance sensor to the central processor unit of the double-screen display device when the distance sensor senses a face 100 cm away; and
S30) processing the distance signal and controlling the double-screen display device to be in a normal photographic mode by the central processor unit;
wherein in the step S20), the double-screen display device can be controlled in a self-timer mode by the central processor unit when the distance sensor senses the face within 100 cm.

* * * * *